(12) United States Patent
McKean (10) Patent No.: US 6,902,054 B2
(45) Date of Patent: Jun. 7, 2005

(54) MEDIA JEWEL CASE

(76) Inventor: Patrick Steven McKean, 247 Lonsdale Ave., Dayton, OH (US) 45419

(*) Notice: Subject to any disclaimer, the term of this patent is extended or adjusted under 35 U.S.C. 154(b) by 163 days.

(21) Appl. No.: 10/227,782

(22) Filed: Aug. 26, 2002

(65) Prior Publication Data

US 2003/0038050 A1 Feb. 27, 2003

Related U.S. Application Data

(60) Provisional application No. 60/315,121, filed on Aug. 27, 2001.

(51) Int. Cl.$^7$ ............................................. B65D 85/57
(52) U.S. Cl. ................................... 206/308.1; 206/232
(58) Field of Search ..................... 206/308.1, 309–313, 206/493, 232

(56) References Cited

U.S. PATENT DOCUMENTS

| | | | |
|---|---|---|---|
| 4,519,500 A | * | 5/1985 | Perchak ........................ 206/312 |
| 5,305,931 A | * | 4/1994 | Martin et al. ................ 222/480 |
| 5,405,008 A | | 4/1995 | Tanaka et al. |
| 5,556,683 A | | 9/1996 | Ranalli |
| 5,653,335 A | * | 8/1997 | Bauer et al. ............. 206/307.1 |
| 5,678,479 A | | 10/1997 | Shimokuni |
| 5,722,538 A | | 3/1998 | Neely et al. |
| 5,784,171 A | | 7/1998 | Kano |
| 5,833,068 A | | 11/1998 | Fantone |
| 5,850,913 A | | 12/1998 | Fantone et al. |
| 5,950,822 A | | 9/1999 | Cloran et al. |
| 5,964,349 A | | 10/1999 | Odagiri |
| 5,988,375 A | * | 11/1999 | Chang ........................ 206/308.1 |
| 6,079,557 A | | 6/2000 | Lammerant et al. |
| 6,135,654 A | | 10/2000 | Jennel |
| 6,153,038 A | | 11/2000 | Brooker |
| 6,196,384 B1 | * | 3/2001 | Belden, Jr. ................ 206/308.1 |
| 6,409,014 B1 | * | 6/2002 | Hummell et al. ......... 206/308.1 |
| 6,604,635 B1 | * | 8/2003 | Kutaragi et al. ............ 206/579 |

FOREIGN PATENT DOCUMENTS

| | | |
|---|---|---|
| GB | 2154550 | 9/1985 |
| GB | 2249859 | 5/1992 |

* cited by examiner

*Primary Examiner*—Shian T. Luong
(74) *Attorney, Agent, or Firm*—R. William Graham (57) ABSTRACT

A jewel case for storing and transporting compact discs and related optical storage media. The jewel case includes a front cover, back cover and a hinge region connecting the front and back covers. At least one of the surfaces of the covers is treated to enhance its ink-receptive properties such that it can accept direct printing of text, graphics and related indicia, thereby obviating the need for separate printed indicia-containing inserts. Suitable plastic, such as high impact polystyrene, is used to make up the ink-receptive portions of the jewel case, thereby reducing its brittleness. The reduced thickness and simplistic configuration of the jewel case saves manufacturing and shipping costs, while the use of smaller quantities of plastic, as well as the reduction or elimination of paper inserts, results in reduced environmental impact once the jewel case is discarded.

8 Claims, 11 Drawing Sheets

MEDIA JEWEL CASE

This is a continuation-in-part of U.S. Ser. No. 60/315,121 filed Aug. 27, 2001.

BACKGROUND OF THE INVENTION

The present invention relates generally to jewel cases for transporting and storing compact discs and related media, and more particularly to a media jewel case that can accept printing directly on the surface such that separate slip sheet inserts are not required.

The conventional approach to storing and transporting compact discs (CDs), digital variable discs (DVDs) and related optical storage media includes a hinged, optically transparent plastic container and one or more printable inserts to identify the contents of the media. A centrally-disposed hole in the media frictionally engages a complementary pedestal that includes resilient members that extend from one of the inner surfaces of the container. The printable inserts, typically made from a paper product, engage tabs or slots in the container to prevent the insert from becoming separated from the container. In industry parlance, these containers have come to be referred to as "jewel case" (for CDs) or "Amaray" cases (for DVDs). Within the present context the terms "CD" "CD-ROM" "DVD" "optical disc" "optical storage media" or simply "disc" and the like are used interchangeably to refer generally to such information-storing devices, while the term "jewel case" refers to the container used to house them. With the use of optical storage media in its ascendancy for myriad applications, including software read only memory (ROM), internet service provider (ISP) software, music and motion pictures, has come a concomitant need for safe, inexpensive, reliable and environmentally-friendly containers in which to protect such media during storage and transport. Jewel cases have been a popular choice in satisfying some of these needs due in part to their ability to prevent contact between the data-containing portion of the disc and the adjacent container wall, in effect suspending the disc away from its connection point at the resilient pedestal.

However, present jewel cases add considerable bulk and weight to the final product. This has adverse impacts on both manufacturing costs, as additional raw materials, both paper and plastic, are required, and shipping costs, as the current first class postage rate for a single disc in a conventional jewel case, which typically weighs between 3 and 4 ounces, can become prohibitively expensive, especially when multiple units are being shipped. Moreover, commonly used current plastics, such as conventional injection-molded polystyrene or polycarbonate, tend to be brittle. Upon breakage of the jewel case, stiff, glass-like shards can form, thereby exposing the user to laceration hazards. This is especially disconcerting when the end-user is a child, as he or she might not fully appreciate the danger present in a broken jewel case. Additional concerns regarding the addition of large quantities of non-degradable plastic packaging to landfills and consequent impact on the environment also militate against conventional jewel case use as a media container. Similarly, due to the inability of conventional plastics, with nonporous surfaces and low surface tensions, to hold printing inks, large quantities of paper are typically consumed to provide surfaces upon which information germane to the data on the disc can be placed. The manufacture of a separate insert for printed text, graphics and related information (collectively referred to as printed indicia), which is necessary to provide the user with information pertaining to the disc and its contents, constitutes a significant part of the overall package. Many additional steps are required to prepare, print and package these inserts to ensure compatibility with the jewel case. This drives up packaging costs, as well as adverse environmental impacts, as additional sheets of printed material must be included in the packaging of the disc.

To alleviate some of these concerns, prior art efforts have created jewel cases out of paper products and similar printable materials, or out of different types of plastics. While these solve some of the safety and environmental concerns, they are still expensive to manufacture, as multiple separate components must be assembled, or numerous cutting, folding and adhesion steps are required. fu particular, while the paper-based devices have stressed the need for containers that permit printed matter to be placed directly on the disc container, the nature of these devices, often with extensive contact with the damage-susceptible portion of the disc that contains the optical data, as well as the inability of the container itself to withstand repeated use, is such that long-term viability of the disc is imperiled. Thus, a need exists for a jewel case that is inexpensive to manufacture, including the ability to accept text and graphics printed directly on the surface of the case. A further need exists for a jewel case that can satisfy the aforementioned within the confines of safety, environmental and data integrity considerations.

SUMMARY OF THE INVENTION

These needs are met by the present invention, whereby a jewel case is made from a lightweight opaque, translucent or transparent plastic that can be embossed and have indicia printed directly thereon. Preferably, although not necessarily, the jewel case of the present invention can employ a high impact polystyrene (HIPS) or PEP or PET material. By using HIPS, rather than conventional injection-molded plastic, durable, yet safe jewel case configurations are possible, as the likelihood of forming jagged edges upon breakage is greatly reduced.

Similarly, by placing printed indicia directly onto the jewel case using conventional printing techniques, such as four color offset printing, the amount of separate printable inserts can be reduced, thereby saving weight, cost and natural resources, such as paper. According to a first embodiment of the present invention, a jewel case is disclosed, which includes a front cover, back cover and a connection region, where at least one of the surfaces of the covers is configured to be ink-receptive such that printed indicia used to facilitate identification of the information contained on the disc can be accepted thereon without the necessity for a separate adhesive over layer or an affixed or inserted printed sheet. The one or more surfaces configured to directly accept embossing and printed indicia include enhanced surface tension features, which are achieved through numerous conventional techniques, most of which tend to either make more electrically or chemically reactive, roughen up, or increase the porosity of the plastic. For example, surfaces subjected to well-known corona treatment (also known as corona discharge), flame treatment or etching exhibit surface tension properties that improve the ability of the surface to accept and hold liquids, such as printing ink. In the case of corona treatment, the ink-receptivity of the plastic surface is temporarily enhanced due to the presence of an electrostatic charge deposited on the surface. The connection region connects an edge of the front cover to an adjacent edge along the back cover such that upon folding, the outer edges of the two covers align. Situated within the inside surface of the back cover is a recess to accommodate a conventional-sized media disc. The recess moreover includes centrally-disposed resilient pedestal to effect a secure mount to the disc. This pedestal, in addition to holding the disc in place, provides additional container rigidity and crush resistance. The present jewel case in an as-folded configuration manifests itself in a lightweight construction that weighs less than 2 ounces, including the weight of the inserted media and overwrap.

Optionally, the jewel case can be made of moldable plastics, such as HIPS, to facilitate manufacturability. Another option could be the inclusion of three-dimensional embossed features on one or more of the surfaces of the jewel case, made possible by the moldable nature of HIPS. The plastic can be opaque, translucent or transparent, and can come in a range of thickness, depending on end-user needs. Preferably, the thickness of the sheet stock used to make the jewel case is between 10 and 40 mils thick. The sheet stock comes in differing weights, in 5 mil increments. The lighter material is used for mailing and price sensitive applications, while 30 mil stock is used primarily for CDROMs, while DVDs would use 35 or 40 mil stock, Heavier weights could be used, limited only by press capacity. As another option, the disc-securing central pedestal can include a raised back panel to protect a disc from scratches by having the centrally disposed pedestal rest on top of this panel, thus elevating the disc away from the inner surface of the back cover. This raised back panel can also provide additional container rigidity.

According to another embodiment of the present invention, a jewel case is disclosed that is constructed of a one piece design such that no hinge is necessary in the connection region. The present embodiment can use the same materials as the previous embodiments, as well as having the same enhanced ink-receptive capabilities. The use of a one-piece design would enable very quick, simple manufacturing that would obviate the need for case assembly steps, whether manual or automated. To avoid interference fits, the thin layer of continuous, flexible plastic would include one or more scores at appropriate places along the hinge region to permit the tight closure at the outside of the front and back covers while ensuring that the inside surfaces do not crimp or press against the sensitive media-bearing surface of a disc. The mechanical simplicity and inherent reliability of such an approach would be beneficial in avoiding the conventional hinge structure of typical jewel cases, which have been prone to breakage.

According to another embodiment of the present invention, a jewel case for holding a plurality of discs is disclosed. In addition to having the ink-receptive surface configuration of the previous embodiments, the present embodiment includes additional covers that are foldable onto the back cover along side-mounted connection regions formed along one edge. These covers, each disposed adjacent one opposed side of the back cover, can be folded over, thus forming a thicker jewel case that occupies the same peripheral footprint as the previous embodiments. These additional covers can also be configured to be ink-receptive, as with the previously discussed front and back covers. Optionally, the jewel case can be configured to accept discs of similar or disparate sizes. For example, the case can hold one standard size (4⅞") disc and one "business card" disc of a smaller dimension (3⅛"). As another option, the additional connection regions can include either a conventional hinge structure, or be made from a one-piece foldable layer similar to that of the previous embodiment.

Another embodiment is directed to a jewel case for a media disc, which includes a front cover, a rear cover; and a connecting region integrally formed with the front cover and the rear cover of a high impact material. The material is characterized to provide surfaces of the covers to be ink-receptive such that printed indicia used to facilitate identification of information contained on the media disc can be directly accepted. The front cover is formed in a manner to have a first raised generally planar surface and an integrally connected side wall extending outward therefrom to form a partial enclosure. The rear cover is formed with a first raised generally planar surface of a size slightly less than the first raised planar surface of the front cover, an integrally connected side wall extending outward therefrom and a first depressed region formed in the raised planar surface of the rear cover such that a top surface portion of the first depressed region is configured to retain the media disc thereby forming a partial enclosure for the media disc. The connecting region permits the front cover to fold over and nest the rear cover in a manner to form an enclosure about the media disc.

Further, the jewel case's back surface of the first depressed region and side wall of the rear cover define a card stock sheet receiving region. The jewel case can include a card stock sheet having printed indicia used to facilitate identification of information contained on the media disc contained therein, wherein the card stock sheet is contained within the receiving region. The card stock sheet can include several panels.

The front cover can also include a front lip extending outwardly from the side wall thereof and the rear cover can also include a rear lip extending outwardly from the side wall thereof. When the front cover nests over the rear cover, the front lip is disposed adjacent the rear lip in a manner such that at least part of the lips do not overlap and remain exposed to aid in the separation of the front cover from the rear cover.

According to yet another embodiment of the present invention, a method of producing a jewel case is disclosed. The method includes the steps of receiving stock (in the form of a roll or one Of more sheets); treating at least one surface of the stock to enhance its ink-receptive capabilities; printing suitable indicia on at least one of the surfaces; and forming the stock into jewel case with at least a front cover, rear cover and interconnecting hinge region. For situations where the stock is in roll form, an additional step of converting the roll to sheet form (such as by cutting) will be necessary. One advantage to the sheet approach is that multiple jewel cases can be produced simultaneously on a single sheet, thus increasing production throughput. For example, up to fourteen CDs and nine DV's can be produced from a single 28"×40" sheet. While any moldable plastic with suitable properties can be used, HIPS is optionally the material of choice. Optionally, the step of treating the surface is corona discharge treatment. Typically, corona discharge is performed at the point of manufacture; in such situations, it may be to reapply a charge just prior to use by the jewel case manufacturer. Thus, another optional step could be the reapplication of corona treatment just prior to the printing step. Optionally, the printing step uses conventional four color offset printing, which is capable of providing both high-quality text and graphics. During the printing step, each side may be printed, or only one side need be, depending on the end use. In situations where two-sided printing to first side is printed then allowed to dry for up to 24 hours prior to printing on the other side. Similarly, during the drying period that follows the printing step, contact between adjacent sheets should be avoided to prevent smudging of the drying ink. As part of the forming step, an appropriately-configured die mold will include any embossing or related three-dimensional features, as well as the disc-securing structure of the jewel case, including front and back cover features, with disc engaging portions, hinges and related structure. As a forming step option, the forming step is performed by conventional thermoforming. Preferably, the thermoforming step is the "in line" variety, rather than the "rotary" or "roll feed" variants. The present method is applicable to both the single disc jewel case embodiment, as well as the multi-disc jewel case embodiment, both of which were previously discussed.

According to yet another embodiment of the present invention, a method of packaging an optical storage media in a jewel case is disclosed. After the jewel case is formed, as discussed in the previous embodiment, the disc is inserted into the disc engaging portion of the jewel case, the covers are closed, and the entire package is wrapped in a protective layer, such as shrink wrap or the like. This can be done either manually or by automated machine, both of which are known in the art. Optionally, labels providing additional information (such as promotional materials, instructions, warranty information and the like) may be inserted during the packaging step.

Other advantages and aspects of the present invention will become apparent upon reading the following description of the drawings in conjunction with the detailed description of the invention.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
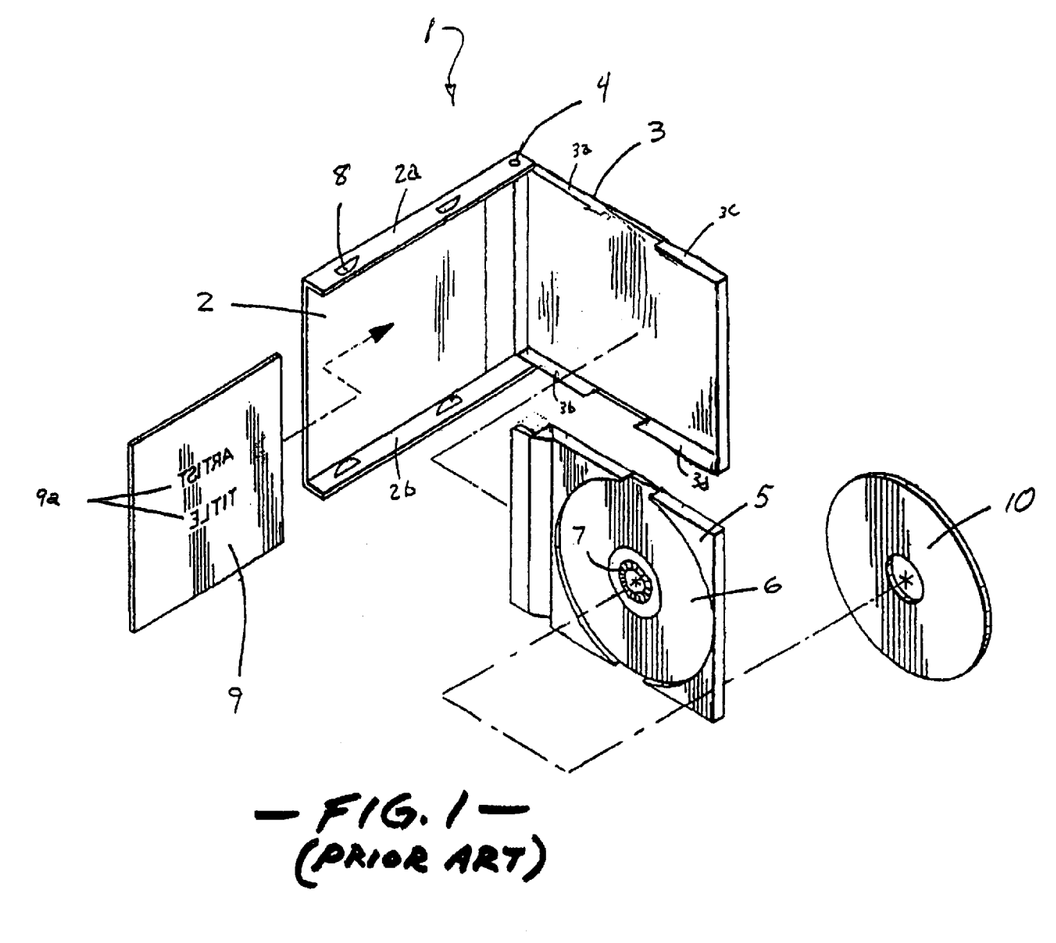
FIG. 1 is a perspective view of a conventional jewel case of the prior art, showing how an optical storage disc and printed insert sheet are disposed therein.

Referring first to FIG. 1, a conventional jewel case 1 associated with the prior art is shown. When closed, the dimensions are approximately 5 9/16" wide, 4 7/8" tall and 3/8" thick. The typical case 1 includes a front cover 2 with sides 2a and 2b, a rear cover 3 with upstanding partial sides 3a, 3b, 3c and 3d, a hinge region 4 to permit hinged connection between front and rear covers 2 and 3, respectively, disc cradle 5 with circular recess 6 and a central pedestal 7, a set of tabs 8 protruding from sides 2a and 2b to engage a printed insert 9, which typically contains textual and graphical indicia 9a to describe the disc contents, and a second insert (not shown) disposed between the disc cradle 5 and rear cover 3 to provide rearward-facing indicia of the disc contents. Disc cradle 5 engages the upstanding partial sides 3a–3d through pins (not shown), while upstanding partial sides 3a and 3b additionally include recesses to accept hinge pins (not shown) in hinge region 4 to permit opening and closing of the case 1. In addition, the spine (not shown) of the case 1 can accommodate a small insert or part of one of the larger inserts to provide edgewise indicia of the contents. A compact disc 10 is insertable into the circular recess 6 of disc cradle 5 until it engages central pedestal 7. The covers 2, 3 and disc cradle 5 are made from a molded plastic, where the covers are normally transparent, and the cradle opaque. The transparent nature of the covers 2, 3 allows indicia printed on the inserts to be clearly visible, so that the user can readily determine the contents of the disc 10.

The one or more inserts (of which insert 9 is representative) need to be installed into the jewel case 1 of the prior art. This task can be somewhat tedious and inefficient, as insert 9, being of a generally flexible substrate (such as paper or related product) will have a tendency to bend (if a single sheet) or fan out (if multiple sheets), thus exacerbating the already delicate task of ensuring that each of the tabs 8 are properly engaged. Similar difficulties arise for the rearward-facing insert and the spine insert (neither of which are shown), which must be placed prior to the assembly of the disc cradle 5 to the rear cover 3 and subsequent connection of the front and rear covers 2, 3 at the hinge region 4.

Figure 2:
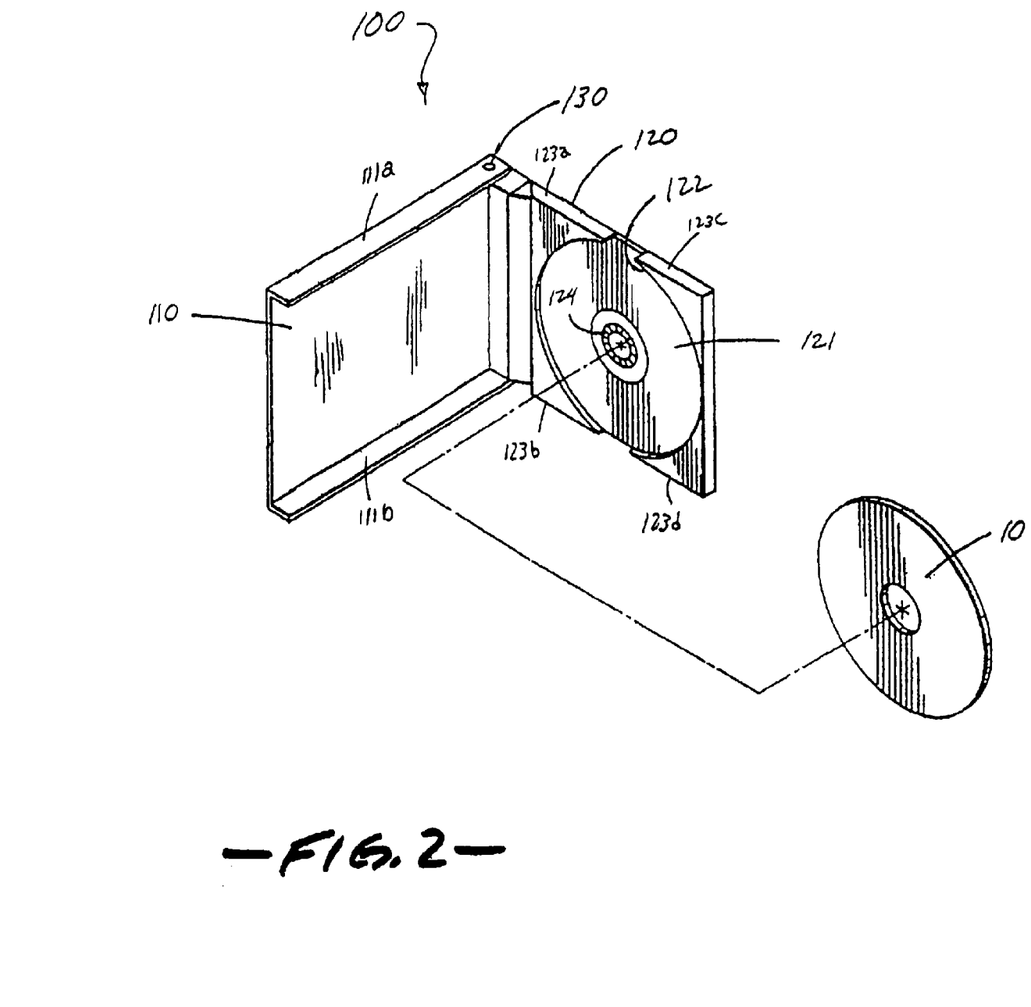
FIG. 2 is a perspective front view of a first embodiment of the jewel case in an opened configuration.
Figure 3:
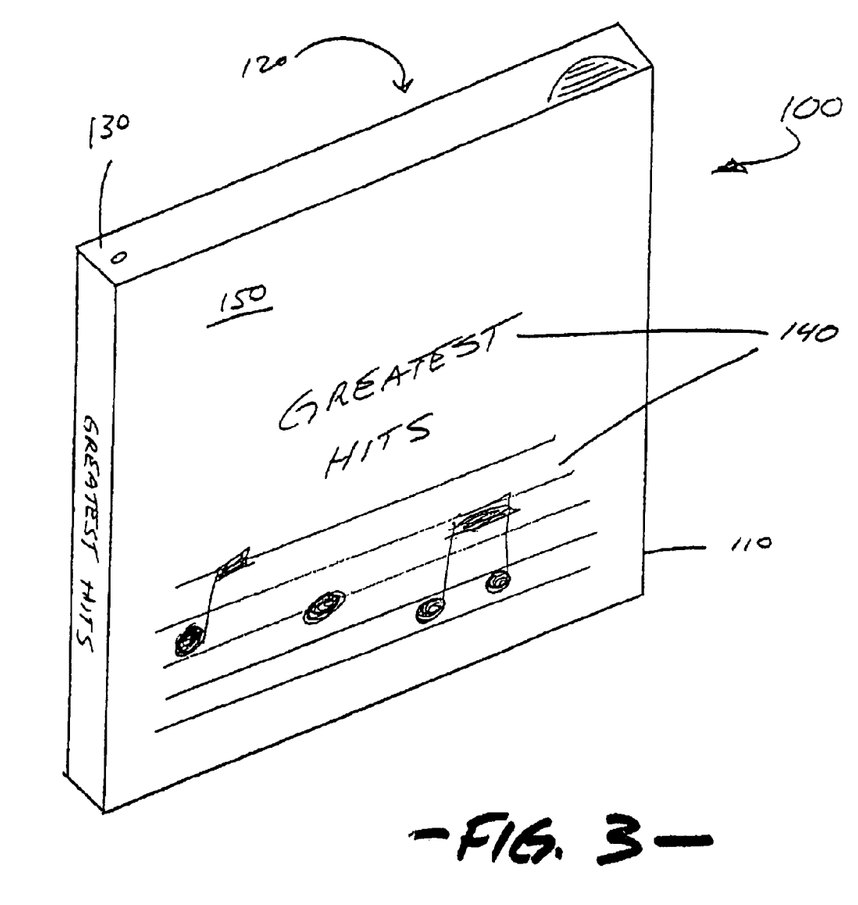
FIG. 3 is a perspective front view of the jewel case of FIG. 2 in a closed, folded-over configuration.

Referring next to FIGS. 2 and 3, a first embodiment of the jewel case for transportation and storage of optical storage media is shown. Jewel case 100 is formed from a moldable plastic material, such as HIPS, and includes a front cover 110, back cover 120 and disc cradle 121 with recess 122 and resilient pedestal 124, and hinge region 130. The thickness of the stock sheets making up the covers can range from about 10 mils (1/100") to about 40 mils (1/25"), depending on packaging requirements and printing press capabilities. The front and back covers 110 and 120, respectively, are foldably joined along a common edge within the hinge region 130. As with the prior art shown in FIG. 1, jewel case 100 includes sides 111a, 111b disposed off at least one of the edges of front cover 110, as well as partial sides 123a–123d to connected to book cover 120 to disc cradle 121. The recess 122 diameter is slightly greater than the diameter of disc 10, thus permitting the exposed surface of the disc 10 to sit substantially flush with the inner surface of the back cover 120, and permitting a user to use a finger to pry the disc 10 out of recess 122 with a minimum of effort. Features pertaining to the direct application of printed indicia 140 to at least one of the surfaces of jewel case 100 are shown with particularity in FIG. 3. The application of printed indicia, such as words and pictures, is accomplished through deposition of the printed matter onto an ink-receptive layer 150 of one or more of the surface (or surfaces) of the front and back cover 110 and 120 or hinge region 130. With many of the hard, structural plastics, such as HIPS, the untreated surfaces will not receive ink due to their relative low surface tension as compared to most ink and related print liquid. Accordingly, the surface has to be given a treatment during the manufacturing process to increase its surface tension. In the most widely-used approach, corona treatment, an electric charge is imposed on the desired surface, details of which are discussed below in conjunction with FIGS. 5 and 7. The creation of enhanced ink receptivity on the surfaces enables low-cost, conventional printing methods, such as four color offset printing, to be employed.

Figure 4:
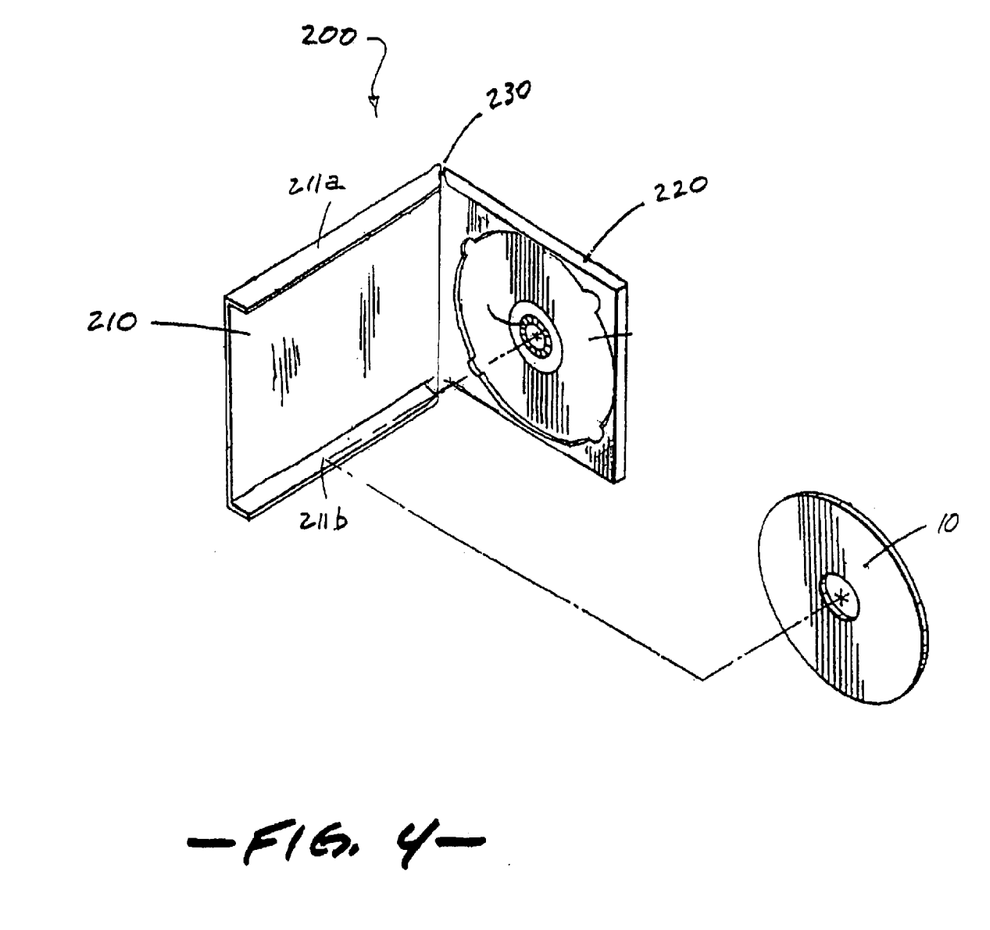
FIG. 4 is a perspective front view of a second embodiment of the jewel case in an opened configuration.

Referring now to FIG. 4, a second embodiment employing one-piece construction is shown. A single sheet of appropriate material, such as the aforementioned HIPS with a treatment-enhanced surface for improved ink receptivity, as discussed in conjunction with the previous embodiment, can be used. Rather than having a front cover connected to a separable back cover through a pinned hinge arrangement, with a separate disc cradle connected to the back cover, the present embodiment is made from a single sheet that is thermoformed (such as by vacuum forming). The hinge region would include appropriate scoring or indentations to facilitate hinge movement. The disc-engaging portions of a traditional disc cradle, including the central pedestal, recess and could be integrally formed as parts of the back cover. Optionally, three-dimensional embossing could be placed on one or more surfaces, to give additional product identifying features. As with the remainder of the cover surfaces, properly treated embossed portions can also be printed upon by conventional methods.

Figure 5:
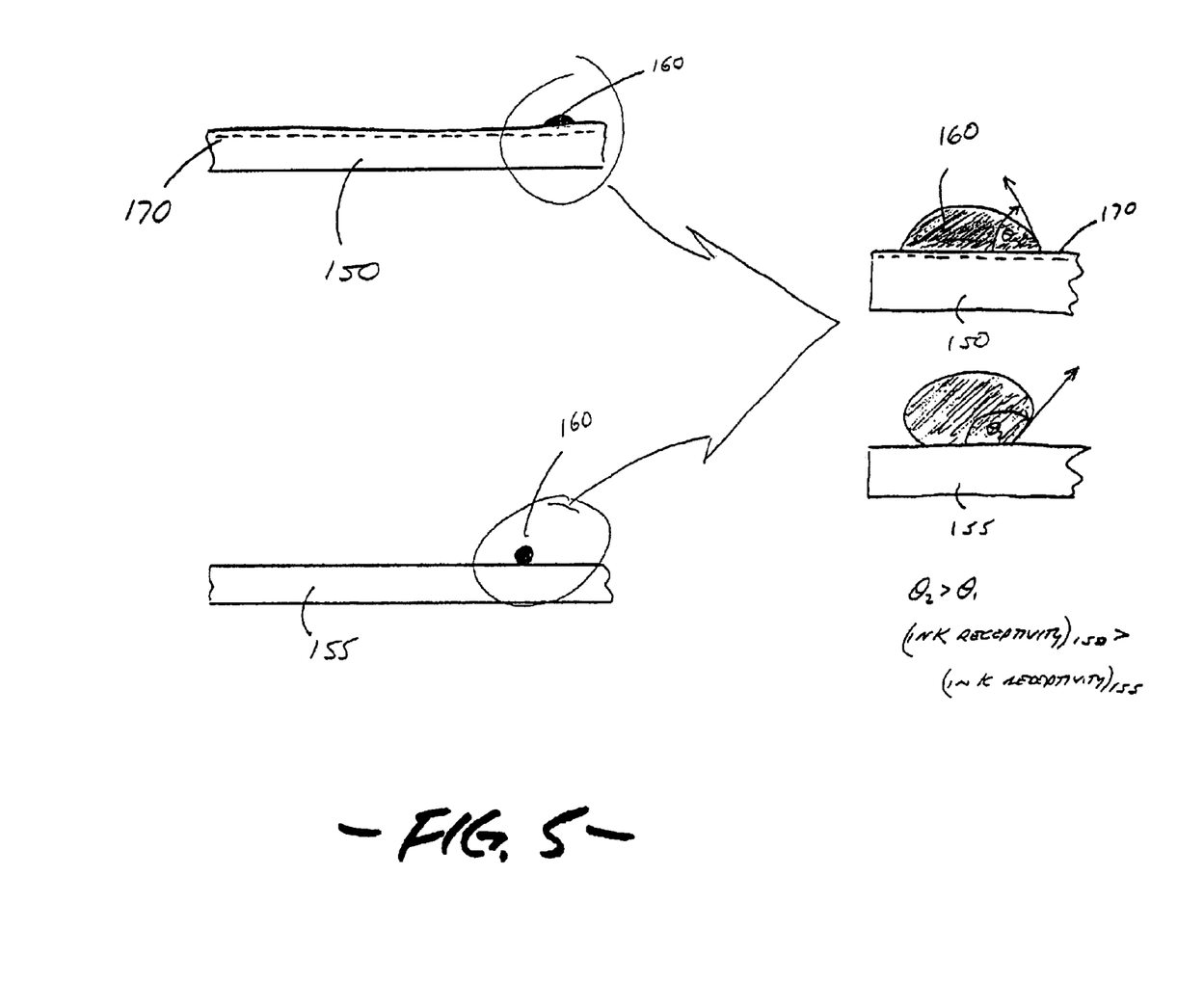
FIG. 5 is an edge-on view of a surface with enhanced ink-receptivity.

Referring now to FIG. 5, an edge-on view of a comparison between a treated surface 150 and an untreated surface 155 is shown. As previously discussed, various methods can be used to either; rough up, increase porosity or make more chemically or electrically reactive plastic surfaces for the purpose of enhancing ink-receptivity. Of these methods, all of which are known in the art, the remaining discussion is limited to the corona discharge method. One of the chief advantages of this method over some of the others is that the texture of the surface is not altered during the surface treatment. This can be important where aesthetic or functional considerations dictate that the nature of the surface not change due to the enhancement of ink receptivity treatment. For example, when transparent stock is being used, the clear, see-through properties of the material are not affected, whereas with a surface roughening treatment, optical properties tend to degrade. The highlighted portion of the figure shows the difference in how an ink droplet 160 responds when placed on each of the respective surfaces, where the corona treatment approach adds a charge 170 to the surface 150 to make it more electrically reactive. This charge tends to attract the ink droplet 160, causing the droplet to spread out on the surface to maximize its exposure to charge 170. This charge has the ability to hold an ink droplet in place until the ink dries. at which time a bond between the ink and the surface is formed. Contrast this situation with the untreated surface 155 shown in the lower part of the figure where, without the addition of the charge, there is no particular propensity between the droplet 160 and the surface 155. Accordingly, the relatively higher surface tension within the droplet 160 tends to dominate, resulting in a more sphere-like ink droplet with concomitant reduced contact area and subsequent bonding capacity. One common way to measure ink receptivity is by the measure of a clockwise rotating angle from the surface of the plastic to the tangent of a line extending from the origin of the angle to the closest place encountered on the periphery of the droplet. The smaller the angle, the higher the surface tension, and the more ink-receptive the surface is.

Figure 6:
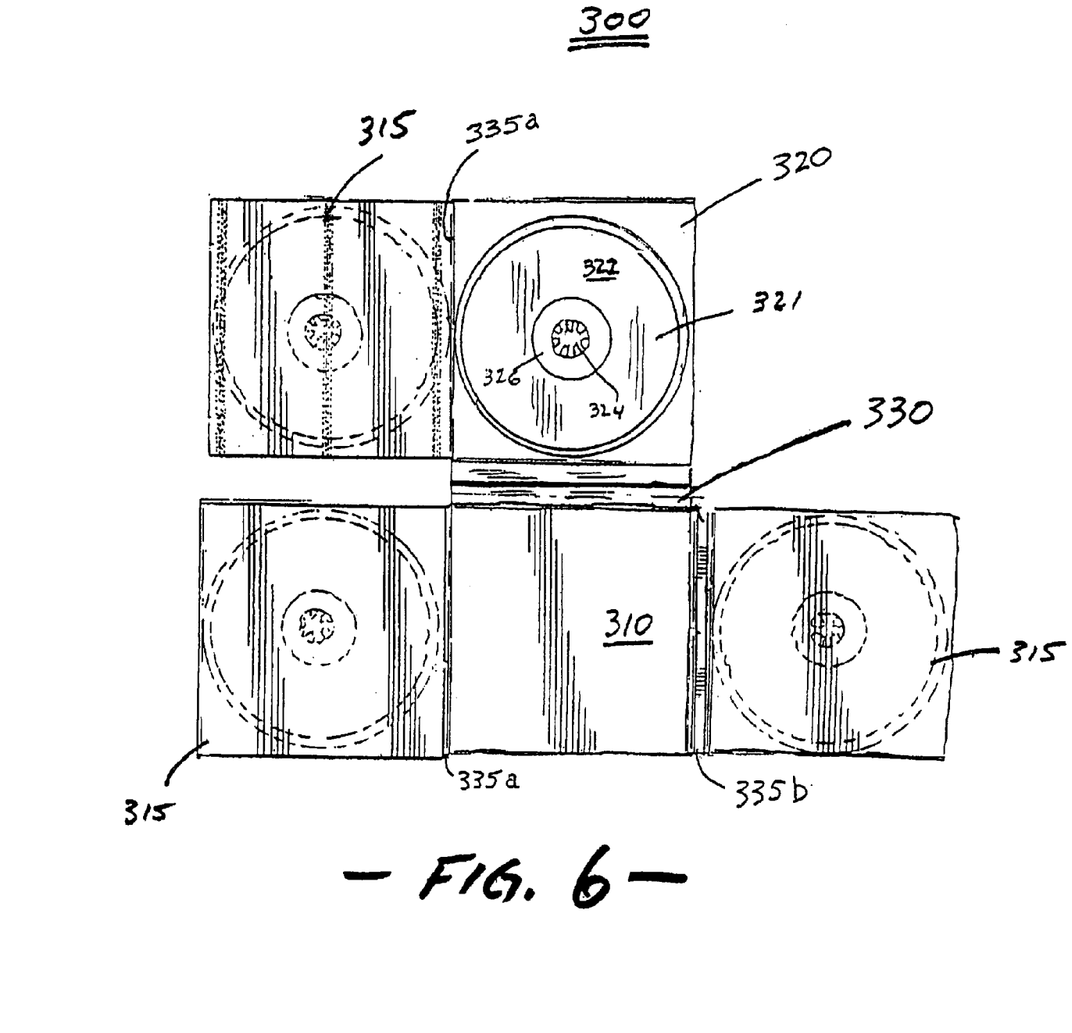
FIG. 6 is a perspective front view of a second embodiment of the jewel case of the present invention, shown in an opened configuration.

Referring next to FIG. 6, a multiple CD jewel case 300 according to another embodiment of the present invention is shown. While the width and height dimensions of the present embodiment (as closed) are substantially the same as those for the previously discussed embodiments, the thickness dimension is greater due to the presence of additional intermediate covers. As with the first embodiment, jewel case 300 includes a front cover 310, back cover 320 and disc cradle 321 with recess 322, resilient pedestal 324 and raised back panel 326. Jewel case 320 may include one or more intermediate covers 315 that are connected to either the front or back covers 310, 320 respectively. Main hinge region 330 can be either a conventional hinge with pins inserted into apertures, or part of a one-piece construction (as shown). In either event, the hinge region 330 needs to be thicker to accommodate the additional layers of disc-holding intermediate covers 315. The present embodiment also includes as many secondary hinge regions 335a, 335b as required to join the intermediate covers 315 to one another (not shown) or to the front or back covers, as depicted in the figure. Secondary hinge region 335a is a single layer thick, while secondary hinge region 335b is multiple layer thick to be used in situations where the cover it is attached to is not the first one folded over, thus necessitating greater thickness, as shown. The thickness of the stock sheets making up the covers is the same as with the previous embodiment. Although the connection regions depicted in the figure are shown as hinging off various edges of the front and back covers 310 and 320, respectively, it will be appreciated by those of ordinary skill in the art that they could all be hinged off a common connection point (such as with the binding of a book), or in an accordion style, where opposing lateral sides of each cover are connected to a common edge with an adjoining cover.

Figure 7:
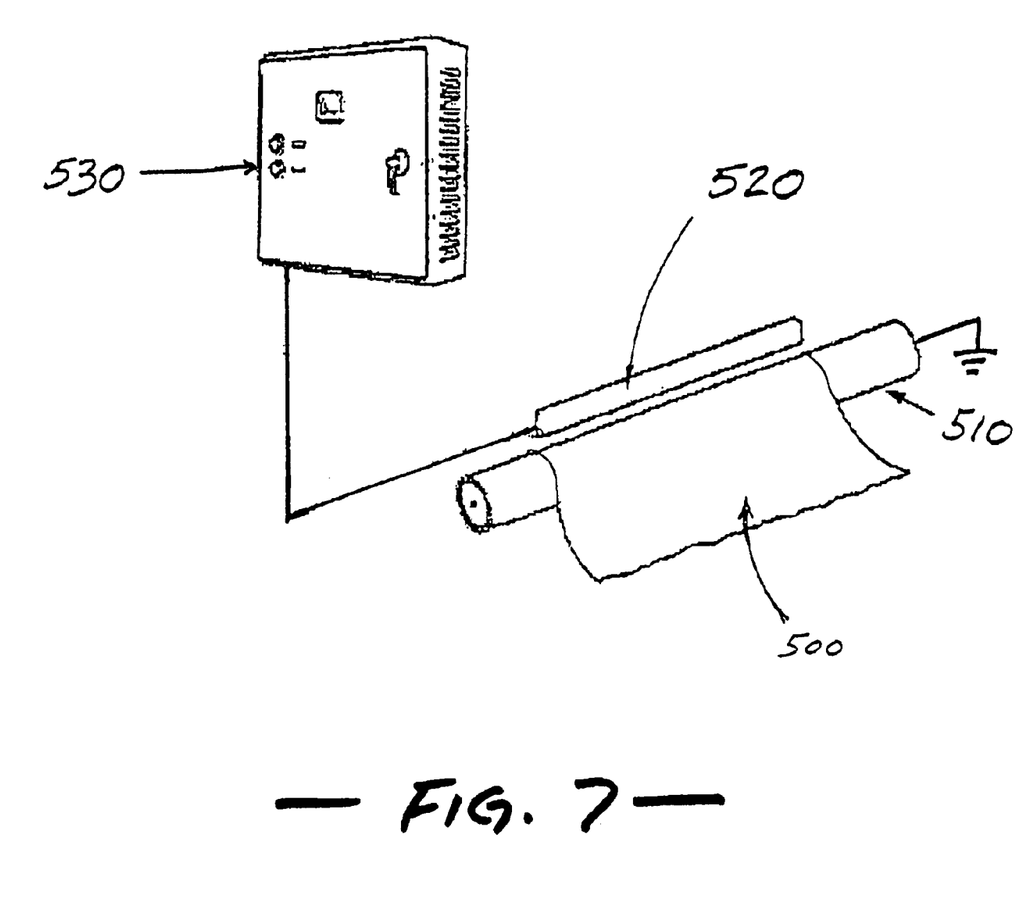
FIG. 7 shows a generalized surface treatment approach using a corona discharge.

Referring now to FIG. 7, a basic schematic of how corona treatment of the surface of a plastic sheet is achieved is shown. Plastic sheet 500, which could be the sheet stock for one or more of the covers for the present invention, is typically moved over a spindle 510 and underneath a charged electrode 520. The charge on the electrode 520 comes from a power supply 530. Extra electrons that are "boiled off" the electrode form a thin layer on top of the surface material, causing a temporary localized charge on the material. The nature of the charge is temporary, in that with time, much of the charge can be lost. Loss of charge can also be affected by inadvertent contact between the charged sheet 500 and metal components, such as rollers, brackets and related production/fabrication equipment. Consequently, some handling precautions are warranted to ensure maximum shelf-life of the charge. These procedures and precautions are well known in the corona treatment industry, and are not the subject of the present invention. The localized charge on the surface of sheet 500 increases the reactivity of the layer, as it can attract the polar molecules of a water-based ink, making it more hydrophilic. As previously discussed, this results in an enhanced ability of the layer to bond with a droplet of ink (not presently shown) while the ink dries.

Referring to FIGS. 9–14, another embodiment of the present invention is provided. Here, the jewel case 1000 is configured for receipt of a media disc D. The jewel case 1000 includes a front cover 1002, a rear cover 1004 and a connecting region 1006 integrally formed with the front cover 1002 and the rear cover 1004.

Similarly as previously described, the jewel case 1000 is preferably thermoformed of a high impact material. The material is characterized to provide surfaces of the covers to be ink-receptive such that printed indicia used to facilitate identification of information contained on the media disc D can be directly accepted.

The front cover 1002 is formed in a manner to have a raised generally planar surface 1008 and an integrally connected side wall 1010 extending outward therefrom, here shown generally normal to and continuous about the periphery of the surface 1008, to form a partial enclosure for the media disc D. The rear cover 1004 is similarly formed with a raised generally planar surface 1012 and is of an area size slightly less than the raised planar surface 1008 of the front cover 1002. An integrally connected side wall 1014 extends outward from the surface 1012, here shown generally normal to and continuous about the periphery of the surface 1012.

A depressed region 1016 is formed in the raised planar surface 1012 of the rear cover 1004 such that a top surface portion 1018 of the depressed region 1016 is configured to retain the media disc D thereby forming another partial enclosure for the media disc D. The connecting region 1006 permits the front cover 1002 to fold over and nest the rear cover 1004 in a manner to form an enclosure about the media disc D as shown in FIGS. 11–14, for example.

Figure 12:
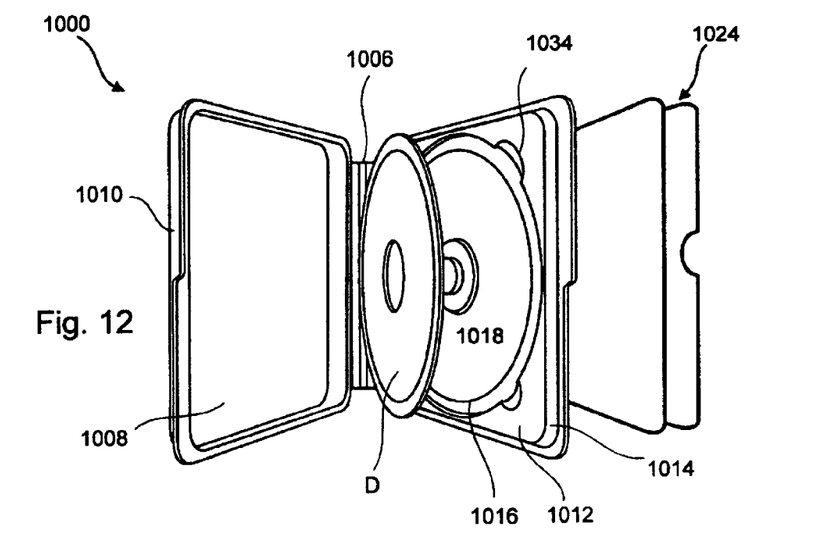
FIG. 12 depicts a front exploded perspective view of the embodiment of FIG. 9 with a media disc and card stock sheet back insert.
Figure 13:
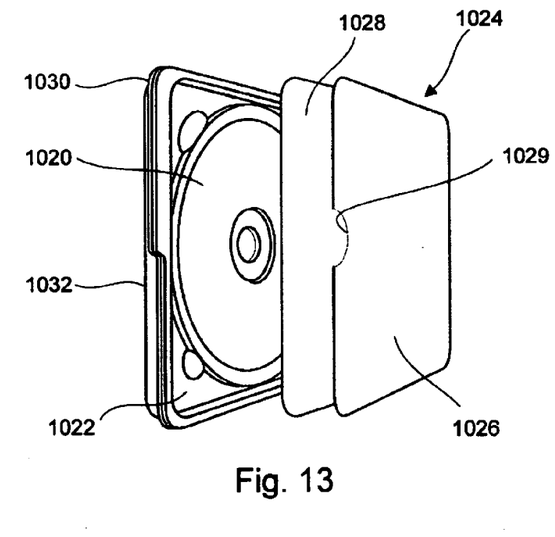
FIG. 13 shows a back exploded perspective view of the embodiment of FIG. 9 with a card stock sheet back insert.
Figure 14:
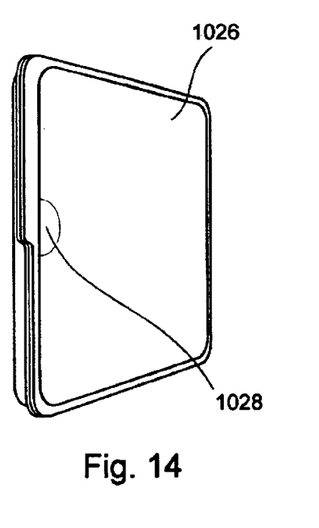
FIG. 14 shows a back perspective view of the embodiment of FIG. 9 with a card stock sheet back insert.

Further, a back surface 1020 of the depressed region 1016, and side wall 1014 of the rear cover define a card stock sheet receiving region 1022. The jewel case 1000 can include a card stock sheet 1024 having printed indicia used to facilitate identification of information contained on the media disc D contained therein. The card stock sheet 1024 is contained within the receiving region 1022 by means of adhesive to the back surface 1020, for example. The card stock sheet 1024 can include several panels, here shown as 1026 and 1028. Panel 1026 can include a cut-away 1029 to aid in the opening of the panel 1026. The panels 1026 and 1028 are preferably relatively thin to fit entirely within the region 1022.

The front cover 1002 can include a front lip 1030 extending outwardly and normal to the side wall 1010 and the rear cover 1004 likewise can includes a rear lip 1032 extending outwardly and normal to the side wall 1014. When the front cover 1002 nests over the rear cover 1004, the front lip 1030 is disposed adjacent the rear lip 1032 in a manner such that at least part of the lips 1030 and 1032 do not overlap and remain exposed to aid in the separation of the covers 1002 and 1004.

The jewel case 1002 can also preferably include one or more depressed regions 1034 formed in the raised planar surface 1012 of the rear cover 1004 and connects the depressed region 1016 to aid in removing the media disc D when disposed in said first depressed region 1020. The region 1020 is shown here to be generally annular.

Figure 15:
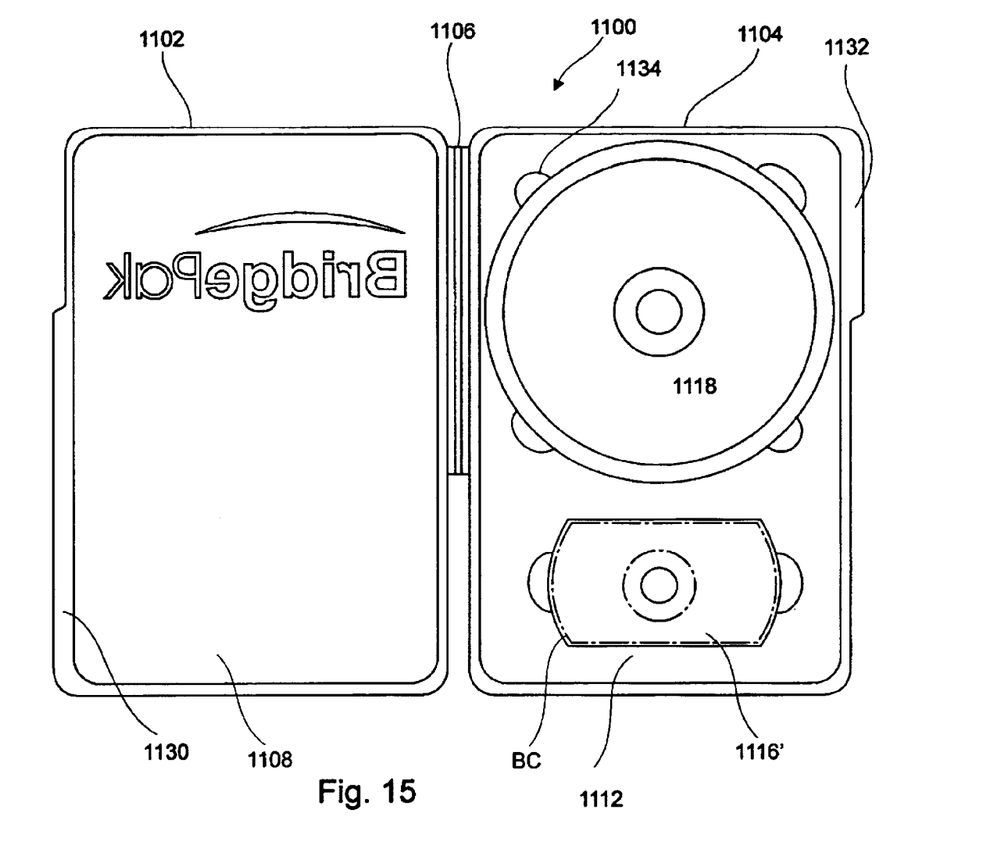
FIG. 15 shows a side view of yet another embodiment in an opened position.

However, the embodiment in FIG. 15 shows a jewel case 1100 which includes another depressed region 1116' formed in raised planar surface 1112 of the rear cover 1104 to retain another media disc of a different configuration, for example, a business card disc.

Figure 8:
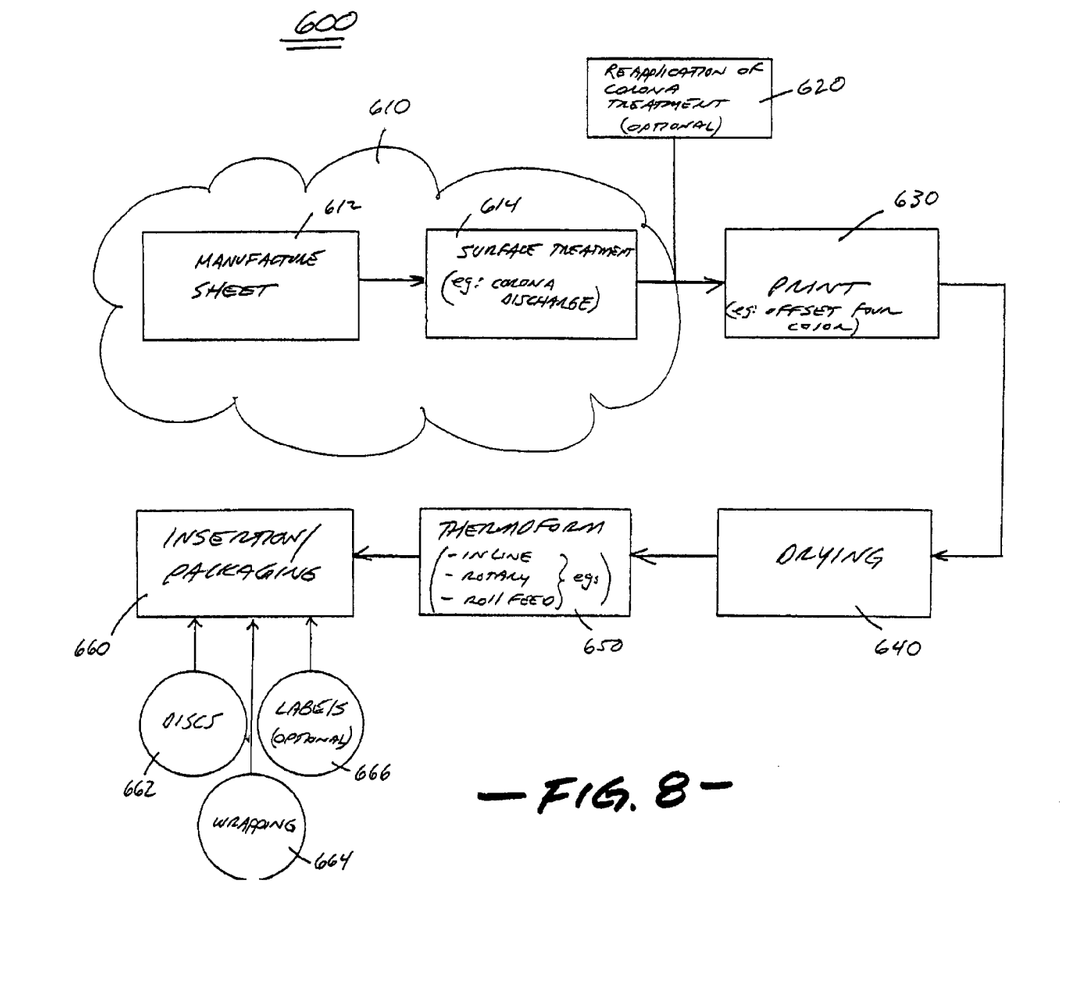
FIG. 8 is a block diagram showing the steps of manufacturing a jewel case according to an embodiment of the present invention.
Figure 9:
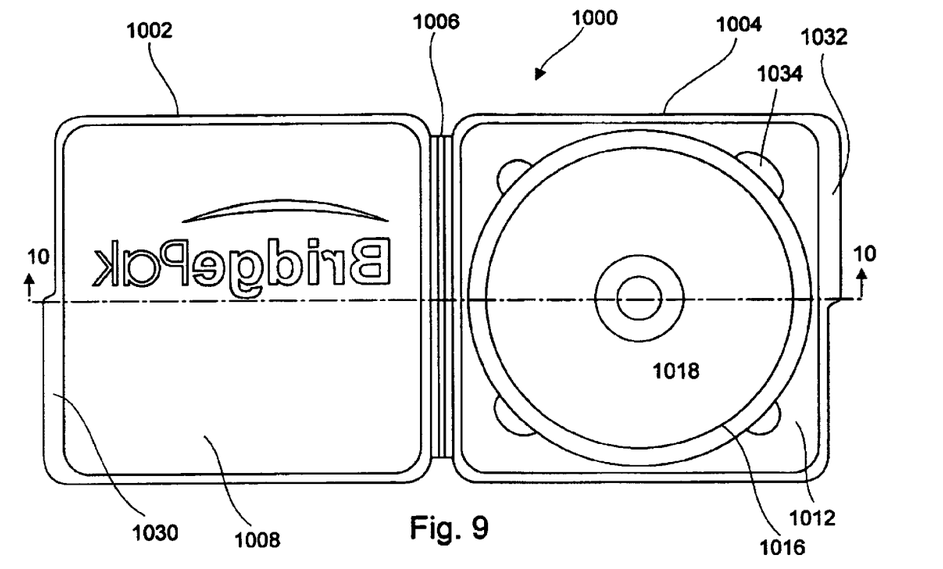
FIG. 9 shows a side view of another embodiment in an opened position.
Figure 10:
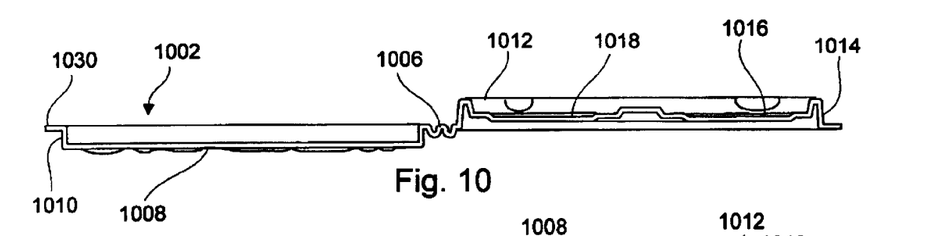
FIG. 10 shows a cross section through line 10—10 of FIG. 9.
Figure 11:
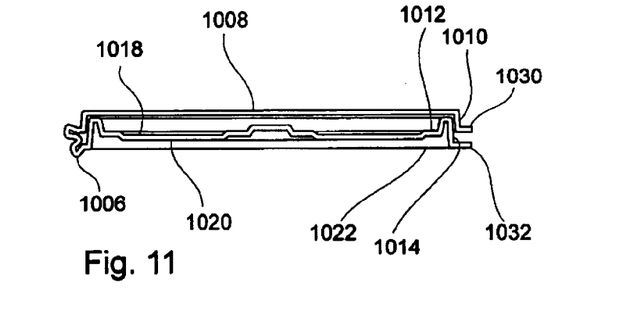
FIG. 11 shows a cross section of the embodiment of FIG. 9 is a closed position.

Referring now to FIG. 8, a block diagram is shown, depicting the various steps involved in the production of a jewel case of the present invention. Upon receipt of appropriately-dimensioned sheet stock that has been surface treated to enhance its ink receptivity, the text or graphics particular to the end use is applied. In situations where the treatment is due to the application of an additional surface charge (such as with corona discharge), it may be necessary to reapply charge just prior to application of the printed indicia to ensure proper bonding. Once the ink from the applied text or graphics dries (which can take up to 24 hours), the sheets may be stacked or readied for thermoforming operations. This involves heating and vacuum forming the sheet in a die such that the particular final or near-net shape can be produced. Typically, this involves a slight elevation in temperature of the sheet, placement of the sheet over the die mold, application of a vacuum to draw the sheet down onto the die, and hydraulic pressure to cut the molded part into its desired shape. It is note that the die mold (which is typically aluminum or similar material) can also have particular embossed features included thereon, so that the three-dimensional relief corresponding to that die can be transferred to the finished jewel case. In addition, the disc engaging features (such as the recess, central pedestal and raised back panel) can be integrally formed with the back cover. One of the chief advantages of a one-piece jewel case made by this approach is that the cumbersome assembly steps associated with the packaging of CDs and DVDs into jewel cases and Amaray cases, respectively, can be eliminated or minimized. After the case is formed, it can be stacked and shipped, or, in situations where disc insertion is also part of the process, have the disc inserted, and overwrap placed around the entire package.

Other modifications of this invention beyond these embodiments specifically described herein may be made without departing from the spirit of the invention. Accordingly, such modifications are considered within the scope of the invention as limited solely by the appended claims.

I claim:

1. A jewel case for a media disc, which includes:
a front cover;
a rear cover; and
a connecting region integrally formed with said front cover and said rear cover of a high impact material, wherein said material is further characterized to provide surfaces of said covers to be ink-receptive such that printed indicia used to facilitate identification of information contained on the media disc can be directly accepted, wherein said front cover is formed in a manner to have a first raised generally planar surface and an integrally connected side wall extending generally normal to and outward therefrom to form a partial enclosure, said rear cover formed with a first raised generally planar surface of a size slightly less than said first raised planar surface of said front cover, an integrally connected said wall extending generally normal to and outward therefrom and a first depressed region formed in said raised planar surface of said rear cover such that a surface portion of said first depressed region is configured to retain the media disc thereby forming a partial enclosure therefor, wherein said connecting region permits said front cover to fold over and nest said rear cover in a manner to form an enclosure about the media disc and, wherein a back surface of said first depressed region and side wall of said rear cover define a card stock sheet receiving region, said jewel case further including a card stock sheet having printed indicia used to facilitate identification of information contained on the media disc, wherein said card stock sheet is contained within said receiving region.

2. The jewel case of claim 1, wherein said material provides said surfaces an ability to directly accept embossing.

3. The jewel case of claim 1, wherein at least one of said covers includes an embossed identifying indicia.

4. The jewel case of claim 1, wherein said surfaces include an enhanced surface tension.

5. The jewel case of claim 1, wherein said card stock sheet includes at least two panels.

6. The jewel case of claim 1, wherein said front cover includes a front lip extending generally normal to and outwardly from said side wall thereof and said rear cover includes a rear lip extending generally normal to and outwardly from said side wall thereof and when said front cover nests over said rear cover said front lip is disposed adjacent said rear lip in a manner such that at least part of said lips do not overlap and remain exposed to aid in the separation of said front cover from said rear cover.

7. The jewel case of claim 1, wherein said first depressed region is generally annular shaped.

8. The jewel case of claim 1, which further include a third depressed region formed in said raised planar surface of said rear cover connecting said first depressed region to aid in removing the media disc when disposed in said first depressed region.

* * * * *